United States Patent
Rince et al.

(10) Patent No.: US 11,502,506 B2
(45) Date of Patent: Nov. 15, 2022

(54) ACTIVE FAIL-SAFE MODULE TO CONTROL THE SAFE STATE OF AN ELECTRICAL MOTOR

(71) Applicant: NXP USA, Inc., Austin, TX (US)

(72) Inventors: Jean-Christophe Patrick Rince, Roques (FR); Jean-Philippe Meunier, Ayguesvives (FR); Erik Santiago, Occitanie (FR); Antoine Fabien Dubois, Santa Clara, CA (US); Maxime Clairet, Labastidette (FR)

(73) Assignee: NXP USA, Inc., Austin, TX (US)

( * ) Notice: Subject to any disclaimer, the term of this patent is extended or adjusted under 35 U.S.C. 154(b) by 86 days.

(21) Appl. No.: 17/021,264

(22) Filed: Sep. 15, 2020

(65) Prior Publication Data

US 2021/0111621 A1    Apr. 15, 2021

(30) Foreign Application Priority Data

Oct. 9, 2019 (EP) ..................... 19306318

(51) Int. Cl.
*H02H 7/08* (2006.01)
*H02M 1/32* (2007.01)
*H02M 7/5387* (2007.01)

(52) U.S. Cl.
CPC ............ *H02H 7/0833* (2013.01); *H02M 1/32* (2013.01); *H02M 7/5387* (2013.01)

(58) Field of Classification Search
CPC .... H02H 7/0833; H02H 1/0007; H02H 7/085; H02M 1/32; H02P 3/22; H02P 27/06; H02P 29/024; H02P 29/0243; H02P 29/027; H02P 29/028
See application file for complete search history.

(56) References Cited

U.S. PATENT DOCUMENTS

| | | | |
|---|---|---|---|
| 6,239,566 | B1 | 5/2001 | Tareilus et al. |
| 9,673,744 | B2 | 6/2017 | Eberlein et al. |
| 2011/0089875 | A1 | 4/2011 | Patel et al. |
| 2013/0314014 | A1 | 11/2013 | Tremel et al. |
| 2018/0208236 | A1 | 7/2018 | Asao et al. |

FOREIGN PATENT DOCUMENTS

EP        2814173 A1    12/2014

*Primary Examiner* — Peter M Novak

(57) ABSTRACT

An apparatus is disclosed that in one embodiment includes a circuit configured to selectively activate a transistor. The circuit is further configured to assert a signal when the circuit detects an electrical short between terminals of the transistor or when the circuit detects the transistor does not conduct current while the transistor is activated by the circuit. The circuit is further configured to output another signal, which is set to a first state or a second state. The other signal is set to the first state when the circuit detects the electrical short. The other signal is set to the second state when the circuit detects the transistor does not conduct current while activated.

11 Claims, 8 Drawing Sheets

ACTIVE FAIL-SAFE MODULE TO CONTROL THE SAFE STATE OF AN ELECTRICAL MOTOR

BACKGROUND

An electric motor is a machine that converts electrical energy into mechanical energy. Electric motors are employed in electric vehicles (EVs) and generate force in the form of rotation of a drive shaft through an interaction between the motor's magnetic field and electric current in wire windings. Electric motors are susceptible to electrical faults. For example, harsh environmental factors can lead to an electrical short or open circuit in an electric motor. Some faults can cause substantial mechanical damage or personal injury. Systems have been developed to monitor electric motors for electrical faults. When fault is detected, the monitoring system can activate a safe state for the motor so that damage or personal injury can be avoided.

SUMMARY

Aspects of the disclosure are defined in the accompanying claims.

In a first aspect, there is provided an apparatus comprising: a circuit configured to selectively activate a transistor; wherein the circuit is further configured to assert a signal when the circuit detects an electrical short between terminals of the transistor or when the circuit detects the transistor does not conduct current while the transistor is activated by the circuit; wherein the circuit is further configured to output another signal, which is set to a first state or a second state; wherein the other signal is set to the first state when the circuit detects the electrical short; wherein the other signal is set to the second state when the circuit detects the transistor does not conduct current while activated.

In one or more embodiments, the apparatus may further comprise: a plurality of first circuits configured to selectively activate a plurality of first transistors, respectively; wherein each of the first circuits is configured to assert a first signal when it detects an electrical short between terminals of its respective first transistor or when it detects its respective first transistor does not conduct current while activated; wherein each of the first circuits is further configured to output a second signal, which is set to the first state or the second state; wherein each of the first circuits sets its second signal to the first state when it detects the electrical short between the terminals of its respective first transistor; wherein each of the first circuits sets its second signal to the second state when it detects its respective first transistor does not conduct current while activated.

In one or more embodiments, the apparatus may further comprise: a plurality of second circuits configured to selectively activate a plurality of second transistors, respectively; wherein each of the second circuits is configured to assert a first signal when it detects a electrical short between terminals of its respective second transistor or when it detects its respective second transistor does not conduct current while activated; wherein each of the second circuits is further configured output a second signal, which is set to the first state or the second state; wherein each of the second circuits sets its second signal to the first state when it detects the electrical short between the terminals of its respective second transistor; wherein each of the second circuits sets its second signal to the second state when it detects its respective second transistor does not conduct current while activated.

In one or more embodiments, the apparatus may further comprise: a microcontroller coupled to and configured to control the plurality of first and second circuits; a control circuit coupled to the microcontroller and the plurality of first and second circuits, wherein the control circuit controls the plurality of first and second circuits in response to detecting a malfunction in the microcontroller.

In one or more embodiments, the control circuit may be configured to assert a first control signal in response to the circuit asserting the signal or in response to any of the first circuits asserting its first signal; wherein the control circuit may be configured to generate a second control signal, which is set to a first voltage or to a second voltage; wherein the second control signal may be set to the first voltage in response to the circuit setting the other signal to the first state or in response to any of the first circuits setting its second signal to the first state; wherein the second control signal may be set to the second voltage in response to the circuit setting the other signal to the second state or in response to any of the first circuits setting its second signal to the second state; wherein the circuit may activate the transistor in response to the control circuit asserting the first control signal and in response to the control circuit setting the second signal to the first voltage; wherein each of the first circuits may activate its respective first transistor in response to the control circuit asserting the first control signal and in response to the control circuit setting the second signal to the first voltage; wherein the circuit may deactivate the transistor in response to the control circuit asserting the first control signal and in response to the control circuit setting the second signal to the second voltage; wherein each of the first circuits may deactivate its respective first transistor in response to the control circuit asserting the first control signal and in response to the control circuit setting the second signal to the second voltage.

In one or more embodiments, the control circuit may be configured to generate a third control signal; wherein the third control signal may be set to the first voltage in response to the circuit setting the other signal to the second state or in response to any of the first circuits setting its second signal to the second state; wherein the third control signal may be set to the second voltage in response to the circuit setting the other signal to the first state or in response to any of the first circuits setting its second signal to the first state; wherein each of the second circuits may deactivate its respective second transistor in response to the control circuit asserting the control signal and in response to the control circuit setting the third signal set to the second voltage; wherein each of the second circuits may activate its respective second transistor in response to the control circuit asserting the first control signal and in response to the control circuit setting the third signal to the first voltage.

In a second aspect, there is provided an apparatus comprising: a plurality of first circuits configured to selectively activate a plurality of first transistors, respectively; wherein each of the first circuits is configured to assert a first signal when it detects an electrical short between terminals of its respective first transistor or when it detects its respective first transistor does not conduct current while activated; wherein each of the first circuits is further configured to output a second signal, which is set to the first state or the second state; wherein each of the first circuits sets its second signal to the first state when it detects the electrical short between the terminals of its respective first transistor; wherein each of the first circuits sets its second signal to the second state when it detects its respective first transistor does not conduct current while activated.

In one or more embodiments, the apparatus may further comprise: a plurality of second circuits configured to selectively activate a plurality of second transistors, respectively; wherein each of the second circuits is configured to assert a first signal when it detects an electrical short between terminals of its respective second transistor or when it detects its respective second transistor does not conduct current while activated; wherein each of the second circuits is further configured output a second signal, which is set to the first state or the second state; wherein each of the second circuits sets its second signal to the first state when it detects the electrical short between the terminals of its respective second transistor; wherein each of the second circuits sets its second signal to the second state when it detects its respective second transistor does not conduct current while activated.

In one or more embodiments, the apparatus may further comprise: the plurality of first transistors; the plurality of second transistors; wherein the plurality of first transistors are coupled in series with the plurality of second transistors, respectively.

In one or more embodiments, the circuit may be configured to assert a first control signal in response to any of the first circuits asserting its first signal; wherein the circuit may be configured to generate a second control signal, which is set to a first voltage or a second voltage; wherein the second control signal may be set to the first voltage in response to any of the first circuits setting its second signal to the first state; wherein the second control signal may be set to the second voltage in response to any of the first circuits setting its second signal to the second state; wherein each of the first circuits may activate its respective first transistor in response to the circuit asserting the first control signal and in response to the circuit setting the second signal to the first voltage; wherein each of the first circuits may deactivate its respective first transistor in response to the circuit asserting the first control signal and in response to the circuit setting the second signal to the second voltage.

In one or more embodiments, the circuit may be configured to generate a third control signal, which is set to the first voltage or the second voltage; wherein the third control signal may be set to the first voltage in response to any of the first circuits setting its second signal to the second state; wherein the third control signal may be set to the second voltage in response to any of the first circuits setting its second signal to the first state; wherein each of the second circuits may deactivate its respective second transistor in response to the circuit asserting the first control signal and in response to the circuit setting the third signal set to the second voltage; wherein each of the second circuits may activate its respective second transistor in response to the circuit asserting the first control signal and in response to the circuit setting the third signal to the first voltage.

In one or more embodiments, the apparatus may further comprise: a logic gate coupled between the circuit and the first and second circuits, wherein the logic gate is configured to receive the first signals from the first and second circuits, and wherein the logic gate is configured to generate a logic gate output signal set to the first state or the second state, wherein the logic gate output signal is set to the first state only when one or more of the first signals from the first and second circuits is set to the first state; a first logic gate coupled between the circuit and the first circuits, wherein the first logic gate is configured to receive the second signals from the first circuits, and wherein the first logic gate is configured to generate a first logic gate output signal set to the first state or the second state, wherein the first logic gate output signal is set to the first state only when one or more of the second signals from the first circuits is set to the first state; a second logic gate coupled between the circuit and the second circuits, wherein the second logic gate is configured to receive the second signals from the second circuits, and wherein the second logic gate is configured to generate a second logic gate output signal set to the first state or the second state, wherein the second logic gate output signal is set to the first state only when one or more of the second signals from the second circuits is set to the first state; wherein the circuit is configured to receive the logic gate output signal; wherein the circuit is configured to assert the first control signal in response to the logic gate switching the logic gate output signal to the first state; wherein the circuit is configured to receive the first logic gate output signal; wherein the circuit is configured to set the second control signal to the first state in response to the logic gate setting the logic gate output signal to the first state and in response to the first logic gate setting the first logic gate output signal to the first state; wherein the circuit is configured to receive the second logic gate output signal; wherein the circuit is configured to set the third control signal to the second state in response to the logic gate setting the logic gate output signal to the first state and in response to the second logic gate setting the first logic gate output signal to the first state.

In a third aspect, there is provided an apparatus comprising: a microcontroller configured to control an inverter system; a circuit configured to activate any one of a plurality of states in the inverter system in response to a detection of an electrical fault in the inverter system and in response to a malfunction in the microcontroller.

In one or more embodiments, the apparatus may further comprise the inverter system, wherein the inverter system comprises: a plurality of first transistors; a plurality of second transistors coupled to the plurality of first transistors, respectively; wherein the plurality of safe states comprises a first state and a second state; wherein the plurality of first transistors are activated in the first state; wherein the plurality of second transistors are deactivated in the first state; wherein the plurality of first transistors are deactivated in the second state; wherein the plurality of second transistors are activated in the second state.

In one or more embodiments, the apparatus may further comprise: a plurality of first circuits configured to selectively activate a plurality of first transistors, respectively; wherein each of the first circuits is configured to assert a first signal when it detects an electrical short between terminals of its respective first transistor or when it detects its respective first transistor does not conduct current while activated; wherein each of the first circuits is further configured to output a second signal, which is set to the first state or the second state; wherein each of the first circuits sets its second signal to the first state when it detects the electrical short between the terminals of its respective first transistor; wherein each of the first circuits sets its second signal to the second state when it detects its respective first transistor does not conduct current while activated.

In one or more embodiments, the apparatus may further comprise: a plurality of second circuits configured to selectively activate a plurality of second transistors, respectively; wherein each of the second circuits is configured to assert a first signal when it detects an electrical short between terminals of its respective second transistor or when it detects its respective second transistor does not conduct current while activated; wherein each of the second circuits is further configured output a second signal, which is set to the first state or the second state; wherein each of the second circuits sets its second signal to the first state when it detects the electrical short between the terminals of its respective second transistor; wherein each of the second circuits sets its second signal to the second state when it detects its respective second transistor does not conduct current while activated.

In one or more embodiments, the circuit may be configured to assert a first control signal in response to any of the first circuits asserting its first signal and in response to the malfunction of the microcontroller; wherein the circuit may be configured to generate a second control signal, which is set to a first voltage or a second voltage; wherein the second control signal may be set to the first voltage in response to any of the first circuits setting its second signal to the first state; wherein the second control signal may be set to the second voltage in response to any of the first circuits setting its second signal to the second state; wherein each of the first circuits may activate its respective first transistor in response to the circuit asserting the first control signal and in response to the circuit setting the second signal to the first voltage; wherein each of the first circuits may deactivate its respective first transistor in response to the circuit asserting the first control signal and in response to the circuit setting the second signal to the second voltage.

In one or more embodiments, the circuit may be configured to generate a third control signal, which is set to the first voltage or the second voltage; wherein the third control signal may be set to the first voltage in response to any of the first circuits setting its second signal to the second state; wherein the third control signal may be set to the second voltage in response to any of the first circuits setting its second signal to the first state; wherein each of the second circuits may deactivate its respective second transistor in response to the circuit asserting the first control signal and in response to the circuit setting the third signal set to the second voltage; wherein each of the second circuits may activate its respective second transistor in response to the circuit asserting the first control signal and in response to the circuit setting the third signal to the first voltage.

In one or more embodiments, a logic gate may be coupled between the circuit and the first and second circuits, wherein the logic gate is configured to receive the first signals from the first and second circuits, and wherein the logic gate is configured to generate a logic gate output signal set to the first state or the second state, wherein the logic gate output signal is set to the first state only when one or more of the first signals from the first and second circuits is set to the first state; a first logic gate may be coupled between the circuit and the first circuits, wherein the first logic gate is configured to receive the second signals from the first circuits, and wherein the first logic gate is configured to generate a first logic gate output signal set to the first state or the second state, wherein the first logic gate output signal is set to the first state only when one or more of the second signals from the first circuits is set to the first state; a second logic gate may be coupled between the circuit and the second circuits, wherein the second logic gate is configured to receive the second signals from the second circuits, and wherein the second logic gate is configured to generate a second logic gate output signal set to the first state or the second state, wherein the second logic gate output signal is set to the first state only when one or more of the second signals from the second circuits is set to the first state; wherein the circuit may be configured to receive the logic gate output signal; wherein the circuit may be configured to assert the first control signal in response to the logic gate switching the logic gate output signal to the first state; wherein the circuit may be configured to receive the first logic gate output signal; wherein the circuit may be configured to set the second control signal to the first state in response to the logic gate setting the logic gate output signal to the first state and in response to the first logic gate setting the first logic gate output signal to the first state; wherein the circuit may be configured to receive the second logic gate output signal; wherein the circuit may be configured to set the third control signal to the second state in response to the logic gate setting the logic gate output signal to the first state and in response to the second logic gate setting the first logic gate output signal to the first state.

In one or more embodiments, the apparatus may further comprise the inverter system, wherein the inverter system comprises: a gate driver circuit configured to selectively activate a transistor; wherein the gate circuit is further configured to assert a signal when the gate driver circuit detects an electrical short between terminals of the transistor or when the gate driver circuit detects the transistor does not conduct current while the transistor is activated by the circuit; wherein the gate driver circuit is further configured to output another signal, which is set to a first state or a second state; wherein the other signal is set to the first state when the gate driver circuit detects the electrical short; wherein the other signal is set to the second state when the gate driver circuit detects the transistor does not conduct current while activated.

BRIEF DESCRIPTION OF THE DRAWINGS

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

Electric motors are powered by direct current (DC) sources (e.g., batteries), or by alternating current (AC) sources (e.g., the electrical grid). In addition to AC versus DC types, electric motors may be brushed or brushless, may be of various phases (e.g., single-phase, two-phase, three-phase, etc.). The present disclosure will be described with reference to a three-phase DC electrical motor powered by a battery, it being understood the present disclosure should not be limited thereto. Moreover, the present disclosure will be described with reference to an electric motor employed in an electric vehicle (EV), it being understood that present disclosure should not be limited thereto.

Microcontrollers are used to control and monitor electric motors. If an electrical fault is detected, the microcontroller can activate a safe state in the motor. Unfortunately, microcontrollers can malfunction. A malfunctioning microcontroller may not be able to activate a safe state for the motor if a fault is detected. Failsafe modules are provided with microcontrollers and act as safety backups thereto. If the microcontroller fails to activate a safe state for the motor when a fault occurs, the failsafe module should step in and activate a safe state.

Figure 1:
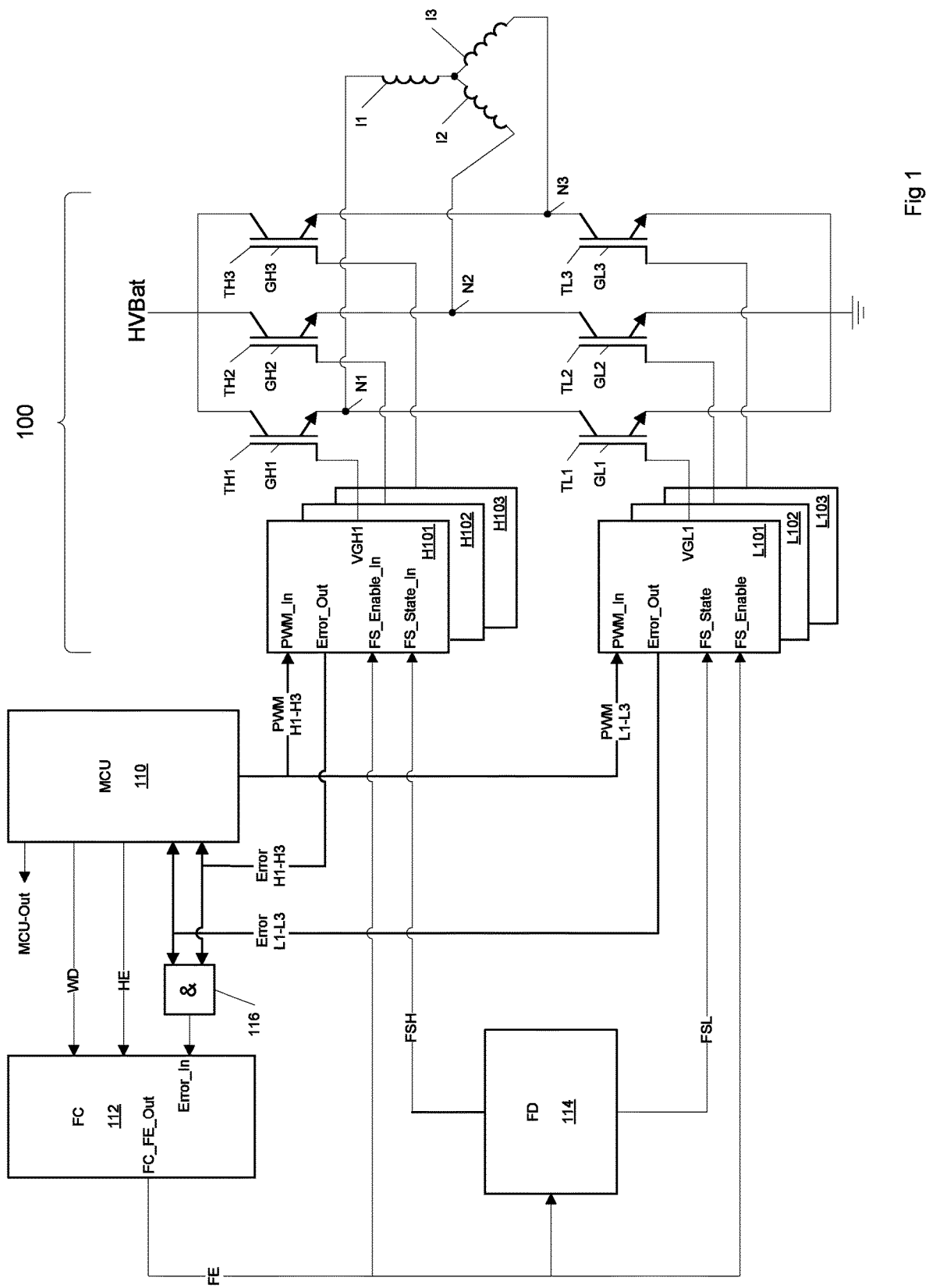
FIG. 1 illustrates relevant components of an example three phase, pulse-width modulation (PWM) inverter system.

FIG. 1 illustrates relevant components of an example three phase, pulse-width modulation (PWM) inverter system 100 of an electric motor. In basic terms, an inverter is an electronic device or circuit that changes DC power from a battery to AC power for use by the motor. Inverter system 100 includes high side power transistors TH1-TH3 coupled in series with low side power transistors TL1-TL3, respectively, via terminal nodes N1-N3, respectively. The terminal nodes N1-N3 in turn are coupled to windings L1-L3, respectively, of the electric motor. For purposes of explanation only, power transistors TH1-TH3 and TL1-TL3 are insulated-gate bipolar transistors (IGBTs), it being understood the term power transistor should not be limited thereto. The collectors of high side transistors TH1-TH3 are connected to a battery (not shown) that provides a DC voltage HVBat (e.g., 12V, 48V, 1 kV, etc.), while the emitters of low side transistors TL1-TL3 are coupled to a ground return or GND.

Figure 2:
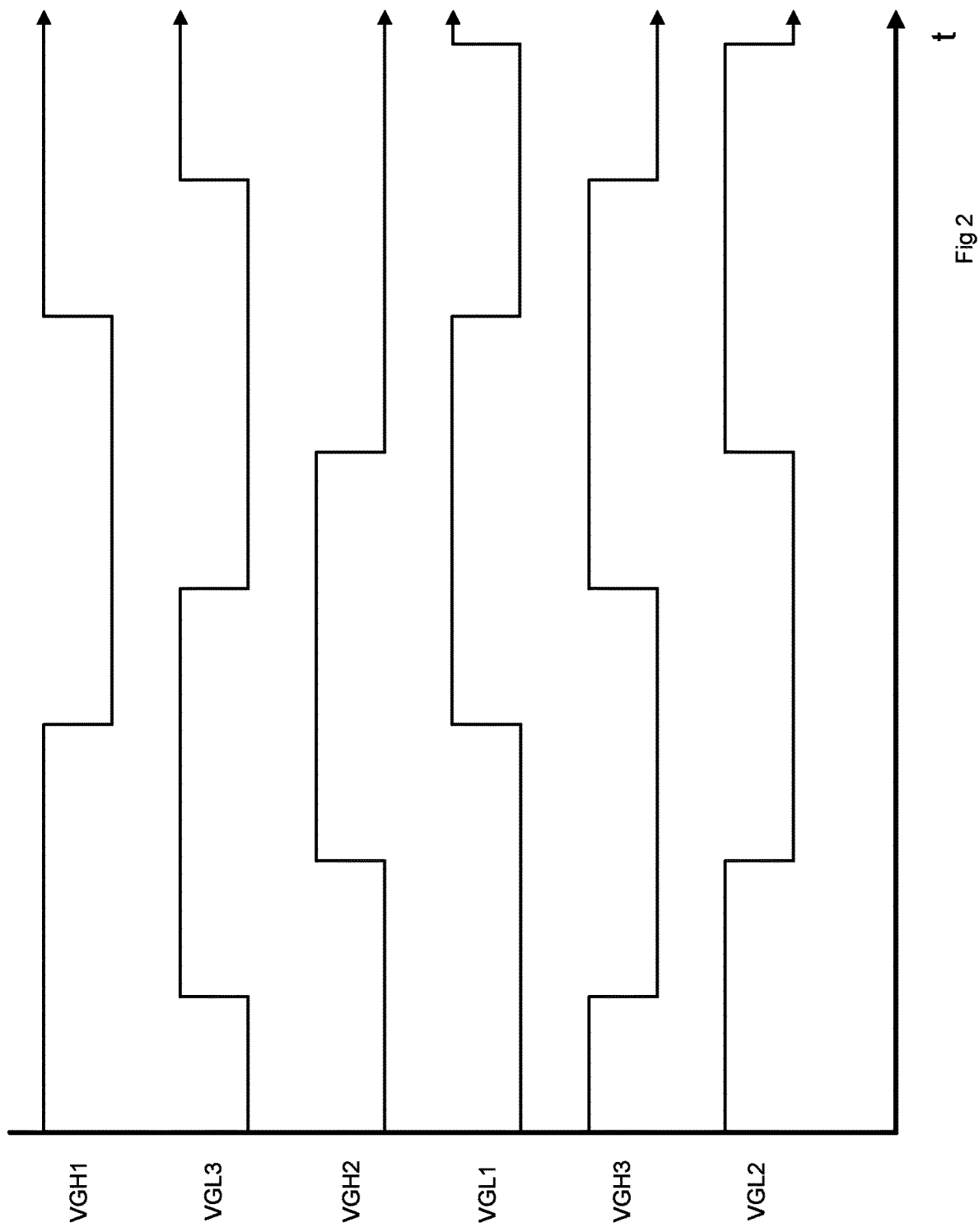
FIG. 2 is a timing diagram illustrating example control signals applied to the transistors of FIG. 1.

Operation of inverter system 100 is relatively simple. High side transistors TH1-TH3 are selectively activated by high side gate drivers H101-H103, respectively, via gate control voltages VGH1-VGH3, respectively, and low side transistors TL1-TL3 are selectively activated by low side gate drivers L101-L103, respectively, via gate control voltages VGL1-VGL3. If functioning properly, each of the power transistors should conduct current to or from a winding when activated by its corresponding gate driver. Through coordinated activation of the high side and low side transistors, the direction of the current is continuously and regularly flip-flopped (current travels into a winding, then abruptly reverses and flows back out). FIG. 2 illustrate a timing diagram for example control voltages VGH1-VGH3 and VGL1-VGL3, and the coordination thereof.

Each of the gate drivers H101-H103 and L101-L103 can detect internal or external electrical failures or faults. If a gate driver detects a fault or failure it will assert a generic error signal. For example, gate driver H101 may monitor the voltage at terminal node N1, which should be HVBat only when TH1 is activated by gate driver H101. If gate driver H101 detects a voltage (i.e. HVBat) at N1 when transistor TH1 is deactivated, then a short circuit is presumed to exist between TH1's collector and emitter, and gate driver H101 will assert generic error signal. Or gate driver H101 may detect an internal failure, which could lead to failure to activate TH1. For purposes of explanation, a signal (e.g., Error-H1 at Error_Out) is asserted when it transitions from a first voltage (e.g., a positive voltage) to a second voltage (e.g., 0V), or visa-versa. For purposes of explanation only, each generic error signal transitions to 0V when asserted (e.g., Error-H1=0V), unless stated otherwise.

Gate driver H101 may also monitor the voltage across a sense resistor (not shown) that is strategically placed in the conductive path between HVBat and TH1's collector. Current should flow through the sense resistor and TH1 when it is activated. If no voltage is detected across the sense resistor by gate driver H101 when transistor TH1 is activated, then an open circuit is presumed to exist. If this condition is detected, gate driver H101 will assert generic error signal Error-H1=0V. If no fault is detected, gate driver H101 will maintain generic error signal Error-H1=Vdd, where Vdd is a positive voltage (e.g., 5V). The other side gate drivers operate similarly. Unfortunately each generic error signal (e.g., Error-H1) generated by a gate driver is a single bit, and doesn't identify the type of fault (e.g., short circuit, open circuit, etc.). Rather, each generic error signal only indicates that something is wrong.

FIG. 1 also shows MCU 110 and failsafe controller (FC) 112, each of which monitor the generic error signal outputs of the gate drivers. MCU 110 or FC 112 can activate a safe state for inverter system 100 if one of the generic error signals is asserted (e.g., Error-H1=0V). In addition to monitoring the generic error signals, FC 112 also monitors MCU 110. If FC 112 detects a MCU 110 has malfunctioned and cannot activate a safe state in response to a reported fault, then FC 112 will activate a safe state. While MCU 110 may be able to activate any one of a number of different safe states for inverter system 100 depending on, for example, the location of the fault in inverter 100, FC 112 activates only one safe state (hereinafter referred to as the "FC safe state"). The FC safe state is implemented by deactivating TH1-TH3 via gate drives H101-H103 and FD 114, and concurrently activating TL1-TL3 via gate drivers L101-L103 and FD 114. In the FC safe state, winding terminals N1-N3 should be connected to ground GND and isolated from HVBat. MCU 110 and FC 112 are more fully described below.

MCU 110 is a compact integrated circuit designed to implement specific operations. Although not shown, MCU 110 includes a central processing unit (CPU), memory, and peripherals such as timers, input/output (I/O) ports, etc., on a single chip. The CPU can program the timers in accordance with software executing on the CPU. Once programmed and started, these timers can autonomously generate PWM signals PWM-H1-PWM-H3 for output to gate drivers H101-H10, respectively, and PWM signals PWM-L1-PWM-L3 for output to gate drivers L101-L10, respectively. Gate drivers H101-H103 generate gate control voltages VGH1-VGH3 based on PWM signals PWM-H1-PWM-H3, and gate drivers L101-L103 generate gate control voltages VGL1-VLH3 based on PWM signals PWM-L1-PWM-L3. The CPU may reprogram the timers in order to adjust duty cycle and period of the PWM signals, which in turn adjusts the rotational speed of the EV's drive shaft. The CPU may also execute software that detects and responds to inverter system faults.

FC 112 acts as a backup to MCU 110 should MCU 110 fail to activate a safe state due to a malfunction therein. FC 112 monitors watchdog (WD) and the HE signals from MCU. The WD signal when asserted indicates a software failure in MCU 110. The hardware error signal HE when asserted indicates a failure in hardware in MCU 110. If either of these signals are asserted, MCU 110 is presumed unable to activate an inverter system safe state in response to the assertion of a generic error signal. To illustrate, if Error-L1 is asserted, and if the WD or HE signal is asserted, FC 112 will activate the FC safe state. More particularly, FC 112 will assert a failsafe enable signal FE at FC_FE_Out. FE is received by FD 114 and each of the gate drivers at FS_Enable_In. When the FE signal is asserted each of the gate drivers will respond to signal received at its FS_State_In input and ignore signals received from MCU 110. More particularly, each of the gate drivers will activate or deactivate their respective power transistors depending upon the state of the signal received at FS_State_In. FD 114 also responds to an assertion of FE. When FE is asserted, FD 114 generates FSH=Vdd, and FSL=0V. FSH and FSL are received at the FS_State_In inputs of the high side gate drivers H101-H103 and low side gate drivers L101-L103, respectively. With FSH=Vdd gate drivers H101-H103 deactivate high side power transistors TH1-TH3, and with FSL=0V gate drivers L101-L103 activate low side power transistors TL1-TL3, thereby activating the FC safe state.

Figure 3:
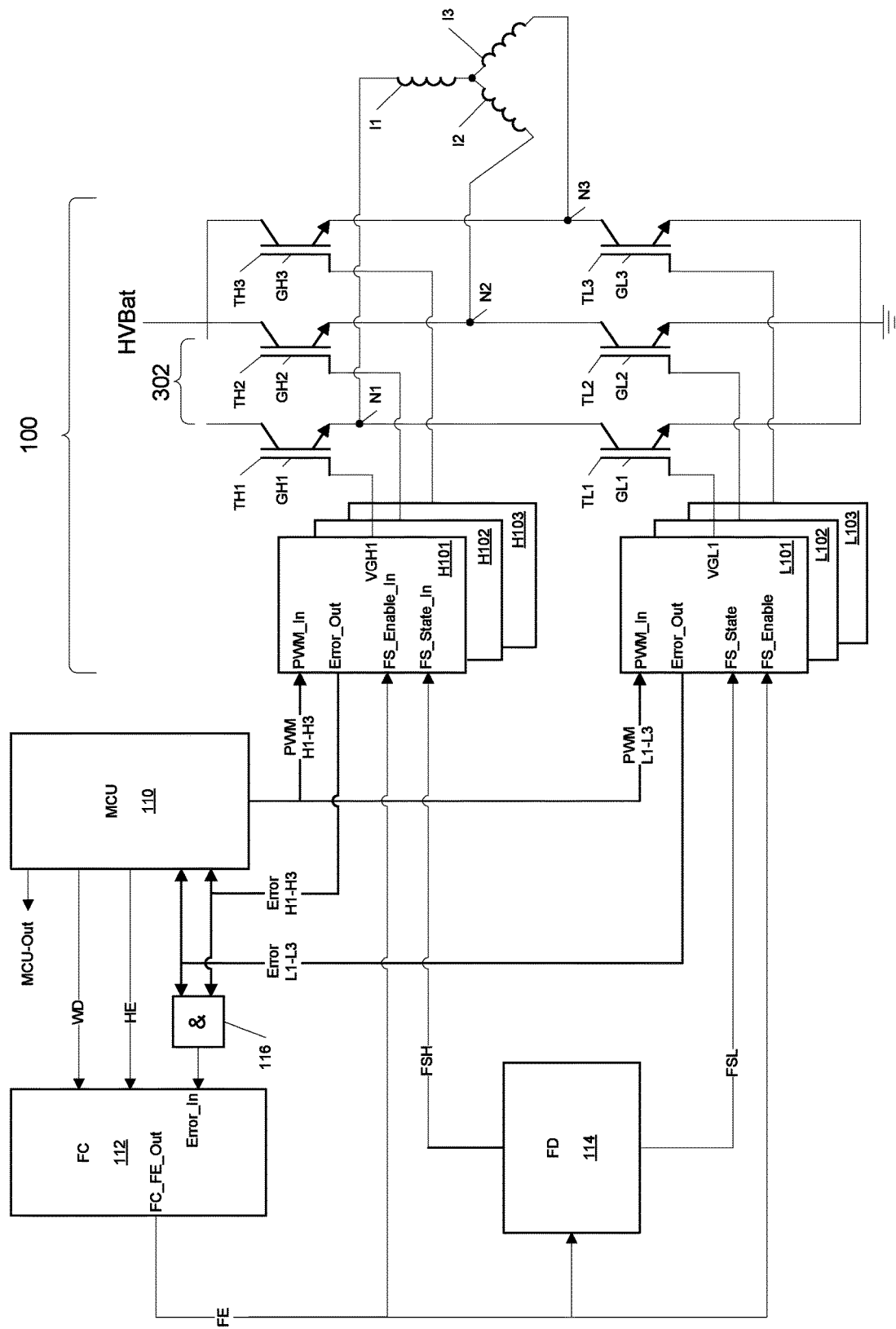
FIGS. 3-5 illustrate example faults in the inverter of FIG. 1.

Operation of FC 112 is better explained with reference to FIGS. 3-5, which illustrate example faults. In FIG. 3, the example fault takes form in an open circuit 302 between the collector of power transistor TH1 and HVBat. Fault 302 may have been created as a result of a weak solder bump that failed after experiencing heavy EV road vibration. The open circuit fault 302 is detected by gate driver H101, and in response it asserts Error-H1=0V. AND gate 116 receives and logically ANDs all generic error signals from the gate drivers, including Error-H1. AND gate 116 will assert its output to 0V. Also in this example, MCU 110 experiences a software fault, and as a result the WD signal is asserted. The asserted output of AND gate 116 and asserted WD signal are both detected by FC 112. In response, FC 112 asserts the FE signal, which in turn activates the FC safe state described above. With the power transistors in the FC safe state, no damage should result to the electric motor as a result of the open circuit 302.

Figure 4:
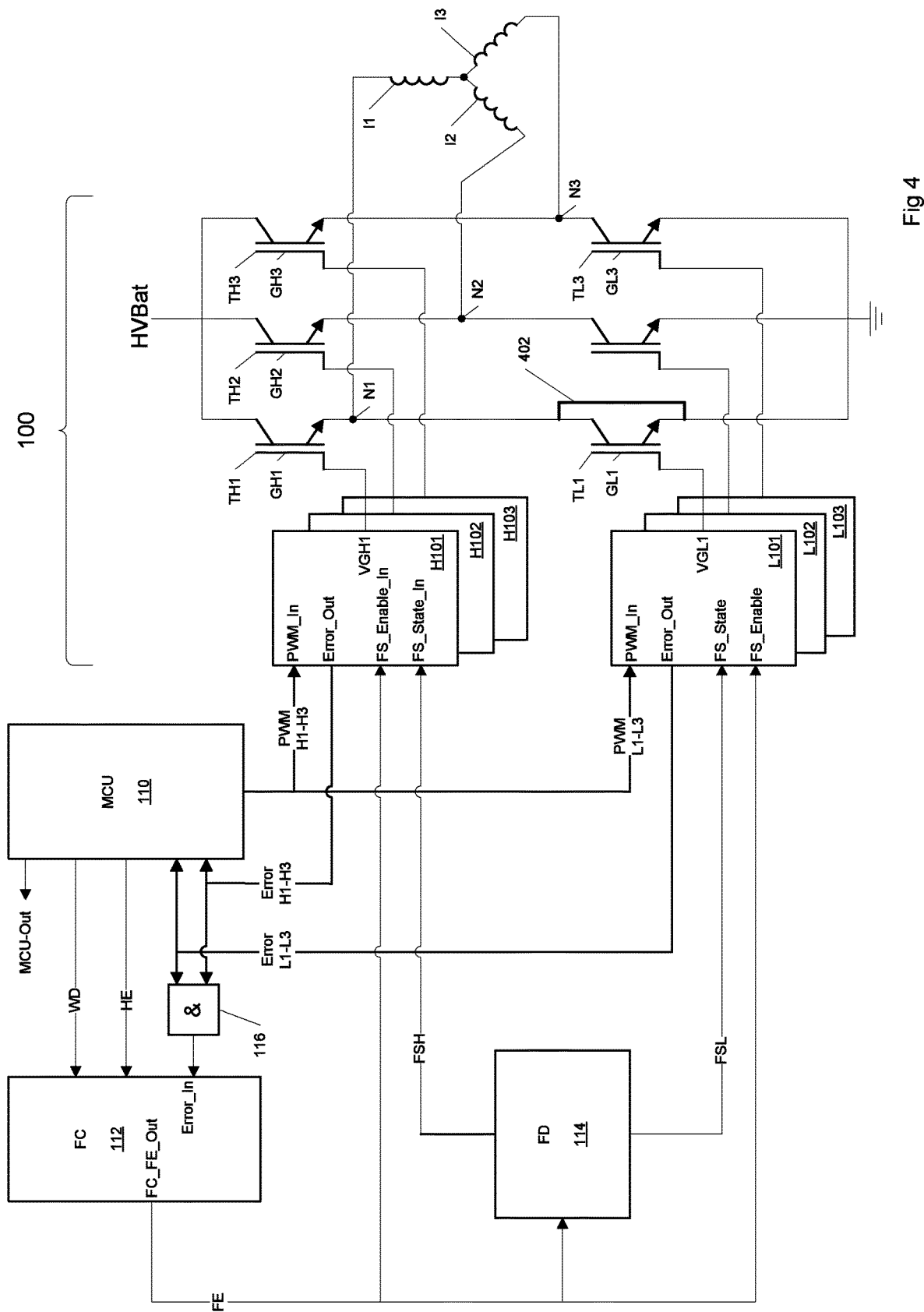
Figure 5:
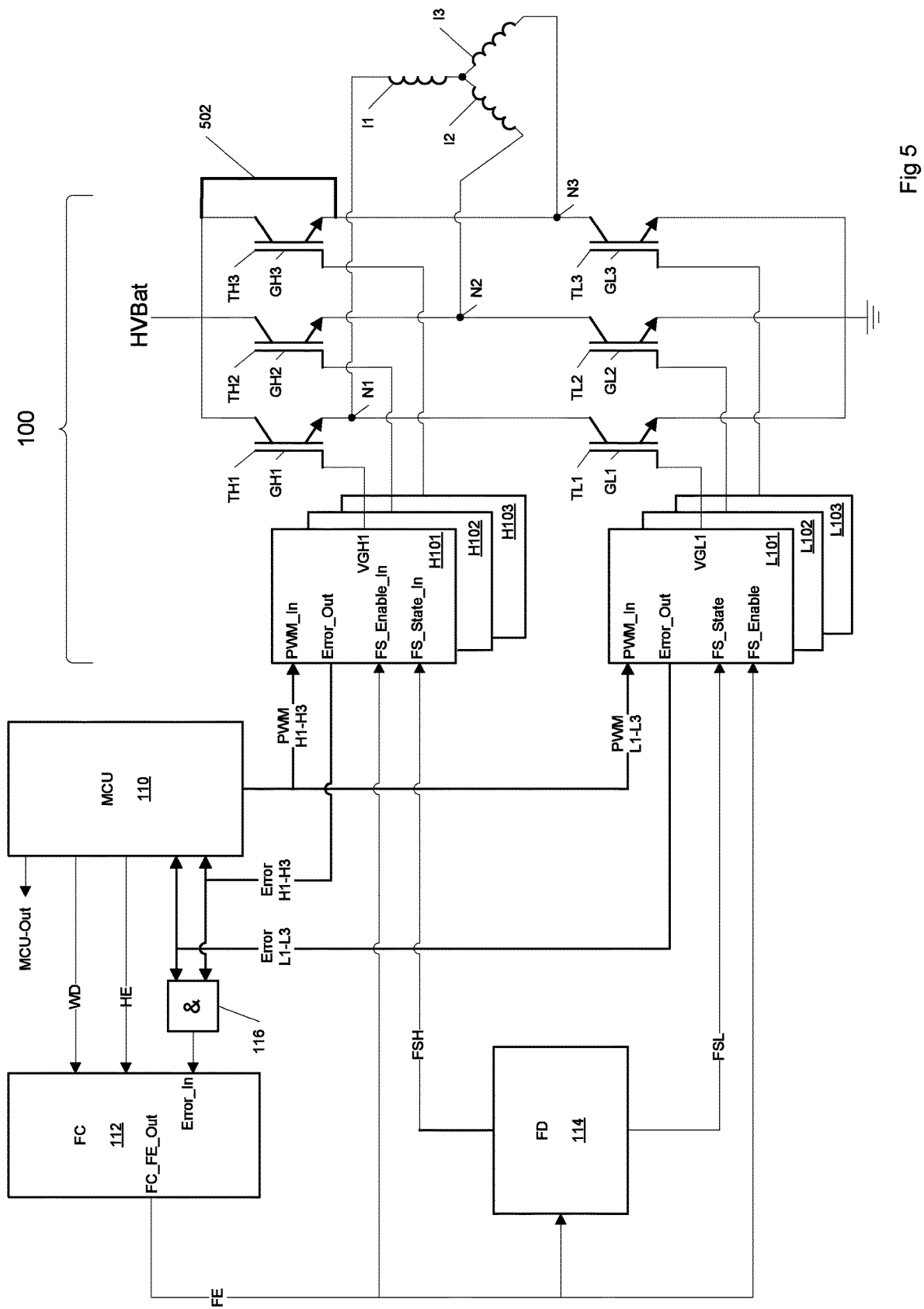

In FIG. 4, the example fault takes form in a short circuit 402 between node N1 and GND. The short circuit 402 may take form in conductive road debris. The short circuit failure is detected by a driver L101, and in response it asserts Error-L1=0V. This causes AND gate 116 to assert its output to 0V, which is detected by FC 112. MCU 110 also experiences a hardware failure and as a result the HE signal is asserted. The asserted output of AND gate 116 and asserted HE signal are both detected by FC 112. In response, FC 112 asserts the FE signal, which in turn activates the FC safe state as described above. With the power transistors in the FC safe state, no damage should result to the electric motor as a result of the short circuit 402.

FC 112 can activate only one safe state (i.e., the FC safe state mentioned above) in which high side transistors TH1-TH3 are deactivated to isolate nodes N1-N3 from HVBat, and low side transistors TL1-TL3 are activated to connect N1-N3 to ground GND. Unfortunately this safe state can present problems for certain types of faults or failures. To illustrate FIG. 5 shows inverter system 100 with a short circuit 502 between winding node N3 and HVBat. This short circuit failure is detected by a driver H103, and in response it asserts Error-H3=0V. Assuming the WD signal is also asserted as a result of a software fault in MCU 110, FC 112 asserts FE. The asserted output of AND gate 116 and asserted WD signal are both detected by FC 112. In response, FC 112 asserts the FE signal, which in turn activates the FC safe state in which low side gate drivers L101-L103 activate low side power transistors TL1-TL3. Activated low side power transistors TL1-TL3 connect N1-N3, respectively, to ground GND. Unfortunately, activated TL3 completes a conductive path between HVBat and ground GND via short 502, which in turn may result in damage. Accordingly, the FC safe state is not appropriate for the situation shown in FIG. 5.

Figure 6:
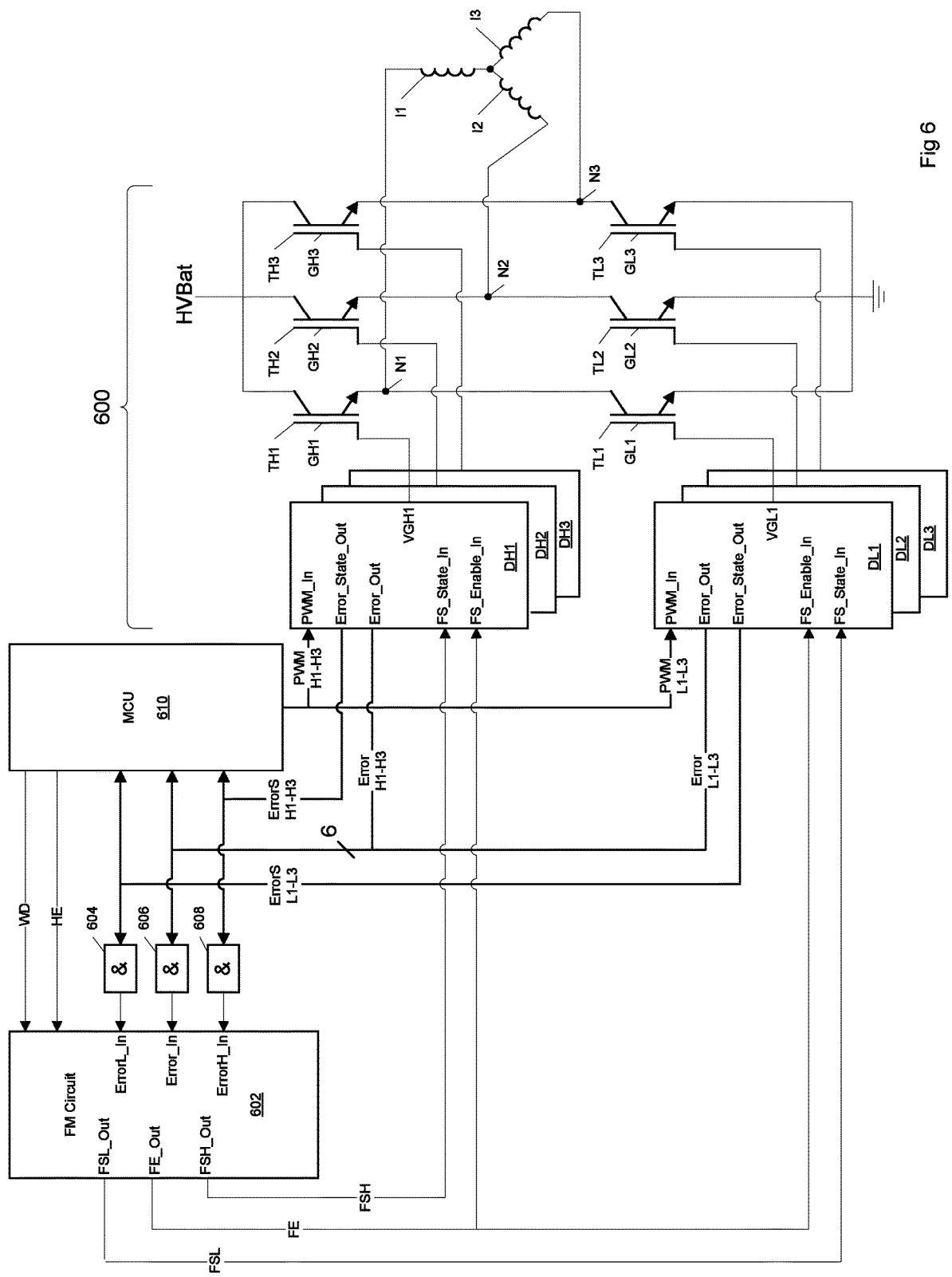
FIG. 6 illustrates relevant components of an example three phase PWM inverter system employing one embodiment of the present disclosure.

The present disclosure provides a failsafe module that addresses the foregoing problem and others. FIG. 6 illustrates a three phase, pulse-width modulation (PWM) inverter system 600, which is monitored by a failsafe module (FM) 602 according to one embodiment of the present disclosure. Inverter system 600 includes many of the components of inverter system 100. However, at least one significant difference exists between the invertor systems; high side gate drivers H101-H103 of FIG. 1 are replaced by high side gate drivers DH1-DH3, and low side gate drivers L101-L103 are replaced by low side gate drivers DL1-DL3. Gate drivers DH1-DH3 and DL1-DL3, like gate drivers H101-H103 and L101-H103, can detect internal and external failures and faults such as short or open circuits between collectors and emitters, or a failure to activate a transistor when directed by MCU 610. Like gate drivers H101-H103 and L101-H103, each of the gate drivers DH1-DH3 and DL1-DL3 can assert a generic error signal (e.g., Error-H1) when it detects a fault. Additionally each of gate drivers DH1-DH3 and DL1-DL3 can assert a specific error signal ErrorS, which indicates the type of fault detected. For purposes of explanation only, ErrorS=0V indicates a short circuit fault, and ErrorS=Vdd indicates an electric open circuit fault or driver failure to activate a transistor. Thus, if gate driver DH1 detects a short circuit across the collector and emitter terminals of transistor TH1, gate driver DH1 will assert generic error signal Error-H1=0V and specific error signal ErrorS-H1=0V. And if gate driver DH1 detects an open circuit across the collector and emitter terminals of transistor TH1, gate driver DH1 will assert generic error signal Error-H1=0V and specific error signal ErrorS_H1=Vdd.

FM 602, which is shown as a block diagram, may take form in an integrated circuit that includes one or more electronic control functions on a single die. FM 602 may include a mixture of digital standard functionality and analog functionality. FM 602 may be a simple hardwired device, a state-machine controlled device that is configurable, for example, through a serial peripheral interface, etc.

FM 602 receives the outputs of AND gates 604-608. AND gate 604 receives the specific error signals ErrorS-L1-ErrorS-L3. AND gate 606 receives all 6 of the generic error signals Error-L1-Error-L3 and Error-H1-Error-H3. AND gate 608 receives the specific error signals ErrorS-H1-ErrorS-H3. FM 602 receives the outputs of AND gates 604-608. AND gate 604 outputs 0V if one or more of the low side gate drivers detect a short circuit fault. AND gate 606 outputs 0V if one or more gate drivers detect a short or open circuit fault. AND gate 608 outputs 0V if one or more of the high side gate drivers detect a short circuit fault. Based upon the output of AND gate 606, FM 602 can determine whether a fault or failure exists within inverter 600. Based upon the output of AND gate 604, FM 602 can determine whether a short circuit fault exists across the collector emitter terminals of one of the high side power transistors. Based upon the output of AND gate 608, FM 602 can determine whether a short circuit fault exists across the collector emitter terminals of one of the low side power transistors. FM 602 may include a central logic circuit (not shown) that directly or indirectly generates output signals FSL, FE, FSH based on input signals from AND gates 604-608, and input signals WD and HE from MCU 610. FSL and FSH should be set in the correct state before FE is asserted. It should be noted that one or more of AND gates 604 can be replaced by an OR gate to accommodate gate drivers that report errors by asserting corresponding error signals to Vdd, and if FM 602 recognizes Vdd as an asserted signal.

MCU 610 of FIG. 6 is substantially similar to MCU 110 of FIG. 1. MCU 610 includes a CPU, memory, and peripherals such as timers, input/output (I/O) ports, etc., on a single chip. The CPU can program the timers in accordance with software executing on the CPU. Once programmed and started, these timers can autonomously generate the same PWM signals described above. PWM-H1-PWM-H3 are provided to gate drivers DH1-DH3, respectively, and PWM signals PWM-L1-PWM-L3 are provided to gate drivers DL1-DL3, respectively. Gate drivers DH1-DH3 generate gate control voltages VGH1-VGH3 using PWM signals PWM-H1-PWM-H3, and gate drivers DL1-DL3 generate gate control voltages VGL1-VLH3 using PWM signals PWM-L1-PWM-L3. The CPU may reprogram the timers in order to adjust duty cycle and period of the PWM signals. The CPU may also execute software that monitors and responds to faults in inverter system 600.

Both MCU 610 and FM 602 can activate a safe state for inverter system 600. Like MCU 110, the CPU of MCU 610 executes software that can activate any one of a number of safe states for invertor system 600 depending on the fault identified therein. FM 602 acts as a backup to MCU 610 should MCU 610 fail to activate a safe state in response to an inverter system fault. In contrast to FC 102, FM 602 can activate any one of multiple safe states. For example, FM 602 can activate at least two safe states (hereinafter referred to as the "FM safe state1" and "FM safe state2"), which will be more fully described below. For the purposes of explanation only, FM 602 will activate either FM safe state1 or FM safe state2, it being understood the present disclosure should not be limited to only two FM safe states.

FM 602 will activate either FM safe state1 or FM safe state2 for inverter 600 depending upon the type and location of a fault. In FM safe state1, FM 602 deactivates or opens TH1-TH3, and activates or closes TL1-TL3. In FM safe state2, FM 602 activates or closes TH1-TH3, and deactivates or opens TL1-TL3. In one embodiment FM 602 activates FM safe state2 when one of the high side gate drivers DH1-DH3 asserts ErrorS=0V thus indicating a short circuit exists across the collector emitter of a corresponding high side power transistor. Otherwise, FM 602 activates FM safe state1.

As noted above, FM 602 acts as a failsafe backup to MCU 610. FM 602 monitors the WD and the HE signals from MCU 610 to determine MCU 610's status. The WD signal when asserted indicates a software fault in MCU 610. The HE signal when asserted indicates a hardware error in MCU 610. If either of these signals are asserted, MCU 610 is malfunctioning and cannot activate a safe state for inverter system 600. Again, FM 602 will activate one of two safe states if MCU 110 fails and cannot activate a safe state for invertor 600.

To illustrate operation of FM 602, if a short circuit is detected across the collector and emitter terminals of TH1, high side gate driver DH1 generates generic error signal Error-H1=0V, and specific error signal ErrorS-H1=0V. These two signals are received by AND gates 606 and 608. As a result, AND gates 606 and 608 assert their outputs at 0V, which are received at FM 602 inputs Error_In and ErrorH_In, respectively. AND gate 604 is presumed to output Vdd to ErrorL_In. FM 602 determines that MCU 610 is not functioning properly as a result of an assertion of the WD or HE signal. Given these circumstances FM 602 activates FM safe state 1. More particularly, FM 602 generates failsafe enable signal FE=Vdd, which is normally at 0V. In addition FM 602 asserts FSL=Vdd and FSH=0V. The FE signal is received by each of the gate drivers at their respective FS_Enable_In inputs. With FE=Vdd, the gate drivers will respond to their FS_State_In inputs and ignore signals from MCU 610. With FE=Vdd and FSH=0V, DH1-DH3 will deactivate TH1-TH3, respectively, and with FE=Vdd and FSH=0V, DH1-DH3 will activate TH1-TH3, respectively. With FE=Vdd and FSL=0V, DL1-DL3 will deactivate DL1-DL3, respectively, and with FE=Vdd and FSL=0V, DL1-DL3 will activate TL1-TL3, respectively.

Figure 7:
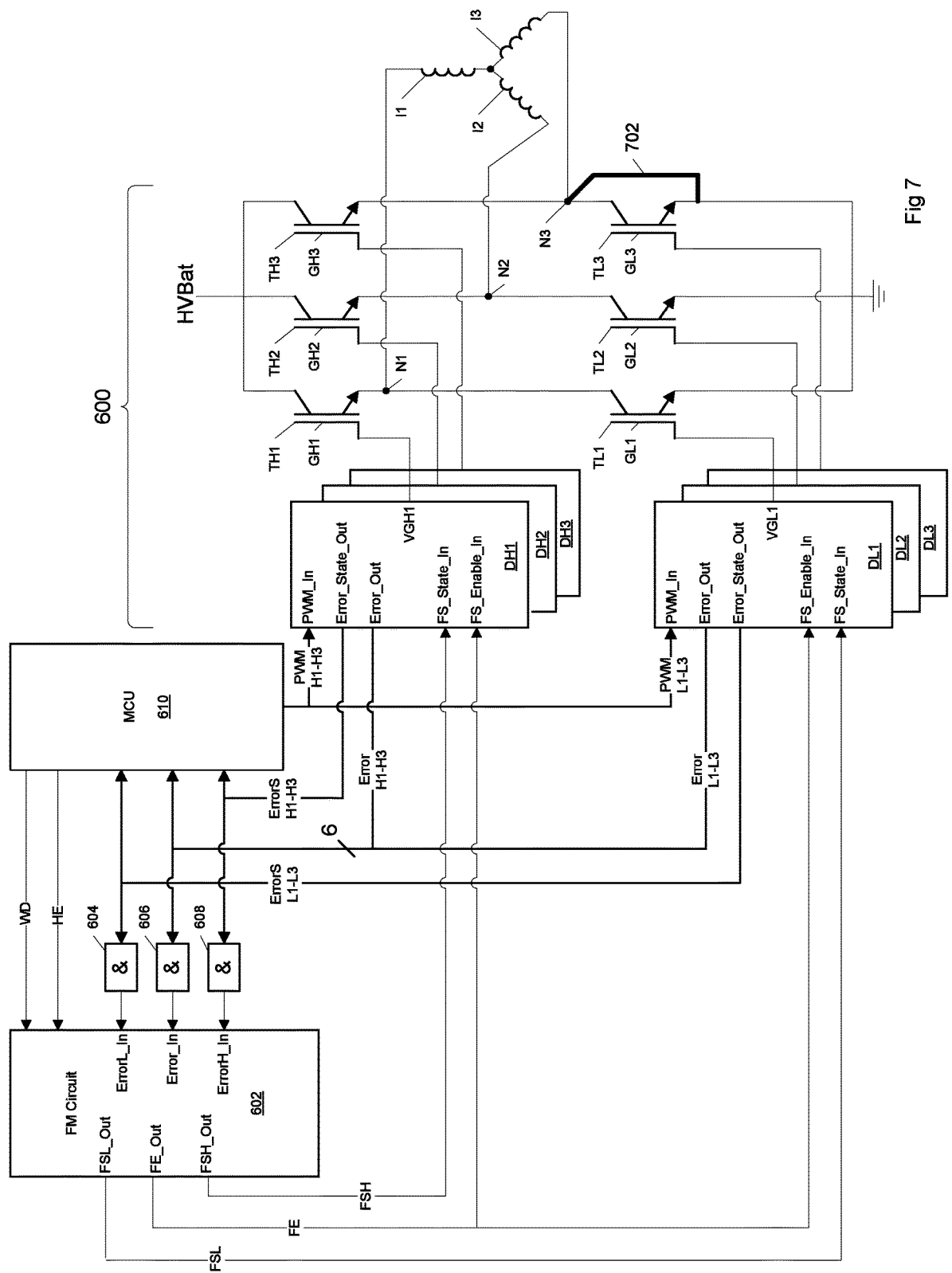
FIGS. 7 and 8 illustrate example faults in the inverter of FIG. 6.

FM 602 can activate FM safe state1 or FM safe state2 depending on the inverter system fault. Operation of FM 602 is better explained with reference to FIGS. 7 and 8, which illustrate example faults in inverter system 600. In FIG. 7, the example fault takes form in a short circuit 702 between the emitter of power transistor TL3 and GND. The short circuit fault 702 is detected by gate driver DL3, and in response it asserts generic and specific error signals Error-L3=0V and ErrorS-L3=0V, respectively. AND gates 604 and 606 receive ErrorS-L3=0V and Error-L3=0V, respectively. The other generic and specific error signals generated by DL1, DL2 and DH1-DH3 remain at Vdd. AND gates 604 and 606 assert their outputs to 0V, which indicate to FM 602 that a short circuit fault exists across one of the low side power transistors TL1-TL3. Also in this example, MCU 110 experiences a software error, and as a result the WD signal is asserted. In response to these input signals, FM 602 activates FM safe state2 by asserting FE=Vdd, FSL=Vdd and FSH=0V. The FE signal is received by each of the gate drivers, and with FE=Vdd, the gate drivers will respond to their FS_State_In inputs and ignore signals from MCU 610. With FSH=0V, DH1-DH3 will open TH1-TH3, respectively, and with FSL=Vdd, DL1-DL3 will close DL1-DL3, respectively.

Figure 8:
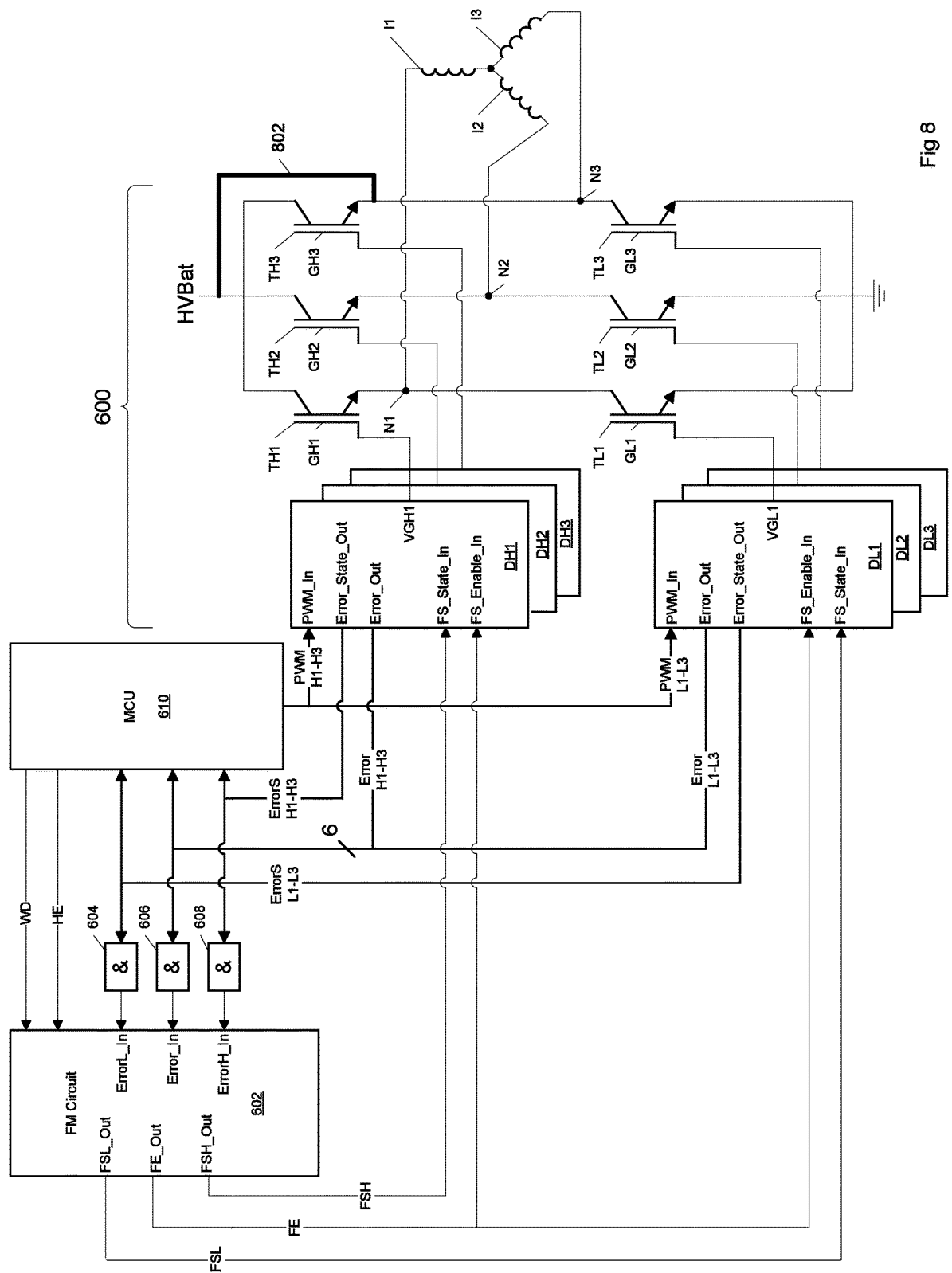

In FIG. 8, the example fault takes form in a short circuit 802 between the emitter of power transistor TH3 and HVBat. The short circuit fault 802 is detected by gate driver DH3, and in response it asserts generic and specific error signals Error-H3=0V and ErrorS-HL3=0V, respectively. AND gates 604 and 606 receive ErrorS-H3=0V and Error-H3=0V, respectively. The other generic and specific error signals generated by DH1, DH2 and DL1-DL3 and are set to Vdd. AND gates 606 and 608 assert their outputs to 0V, which indicate to FM 602 that a short circuit fault exists across one of the high side power transistors TH1-THL3. Also in this example, MCU 110 experiences a software or hardware error, and as a result the WD or HE signal is asserted. In response to these input signals, FM 602 activates FM safe state1 by asserting FE=Vdd, FSL=0V and FSH=Vdd. The FE signal is received by each of the gate drivers, and with FE=Vdd, the gate drivers will respond to their FS_State_In inputs and ignore signals from MCU 610. With FSH=Vdd, DH1-DH3 will close TH1-TH3, respectively, and with FSL=0V, DL1-DL3 will open DL1-DL3, respectively.

An apparatus is disclosed that in one embodiment includes a circuit configured to selectively activate a transistor. The circuit is further configured to assert a signal when the circuit detects an electrical short between terminals of the transistor or when the circuit detects the transistor does not conduct current while the transistor is activated by the circuit. The circuit is further configured to output another signal, which is set to a first state or a second state. The other signal is set to the first state when the circuit detects the electrical short. The other signal is set to the second state when the circuit detects the transistor does not conduct current while activated.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

The invention claimed is:

1. A failsafe apparatus comprising:
a failsafe circuit configured to activate a set of high-side transistors and a set of low-side transistors;
wherein the failsafe circuit is further configured to generate a failsafe enable (FE) signal when the failsafe circuit detects an electrical short or an electrical open between terminals of the set of high-side transistors or the set of low-side transistors;
wherein the failsafe circuit is further configured to generate a failsafe state (FS) signal, which is set to a first state or a second state;
wherein the failsafe state (FS) signal is set to the first state when the failsafe circuit detects the electrical short;
wherein the failsafe state (FS) signal is set to the second state when the failsafe circuit detects the electrical open;
a set of high-side gate driver circuits configured to selectively activate the high-side transistors, respectively;
wherein each of the high-side gate driver circuits is configured to assert a generic error signal when it detects an electrical short between terminals of its respective high-side transistor or when it detects its respective high-side transistor does not conduct current while activated;
wherein each of the high-side gate driver circuits is further configured to output a specific error signal, which is set to the first state or the second state;
wherein each of the high-side gate driver circuits sets its specific error signal to the first state when it detects the electrical short between the terminals of its respective high-side transistor;
wherein each of the high-side gate driver circuits sets its specific error signal to the second state when it detects its respective high-side transistor does not conduct current while activated;
a set of low-side gate driver circuits configured to selectively activate the low-side transistors, respectively;
wherein each of the low-side gate driver circuits is configured to assert the generic error signal when it detects an electrical short between terminals of its respective low-side transistor or when it detects its respective low-side transistor does not conduct current while activated;
wherein each of the low-side gate driver circuits is further configured output the specific error signal, which is set to the first state or the second state;
wherein each of the low-side gate driver circuits sets its specific error signal to the first state when it detects the electrical short between the terminals of its respective low-side transistor;
wherein each of the low-side gate driver circuits sets its specific error signal to the second state when it detects its respective low-side transistor does not conduct current while activated;
a logic gate coupled between the failsafe circuit and the low-side gate driver circuits;
wherein the logic gate is configured to receive the generic error signals from the high-side and low-side gate driver circuits;
wherein the logic gate is configured to generate a logic gate output signal set to the first state or the second state, wherein the logic gate output signal is set to the first state only when one or more of the generic error signals from the high-side or low-side gate driver circuits is set to the first state;
a first logic gate coupled between the failsafe circuit and the high-side gate driver circuits, wherein the first logic gate is configured to receive the specific error signals from the high-side gate driver circuits;
wherein the first logic gate is configured to generate a first logic gate output signal set to the first state or the second state;
wherein the first logic gate output signal is set to the first state only when one or more of the specific error signals from the high-side gate driver circuits is set to the first state;
a second logic gate coupled between the failsafe circuit and the low-side gate driver circuits;
wherein the second logic gate is configured to receive the specific error signals from the low-side gate driver circuits;
wherein the second logic gate is configured to generate a second logic gate output signal set to the first state or the second state;
wherein the second logic gate output signal is set to the first state only when one or more of the specific error signals from the low-side gate driver circuits is set to the first state;
wherein the failsafe circuit is configured to receive the logic gate output signal;
wherein the failsafe circuit is configured to assert the failsafe enable (FE) signal in response to the logic gate switching the logic gate output signal to the first state;
wherein the failsafe circuit is configured to receive the first logic gate output signal;
wherein the failsafe circuit is configured to set the failsafe state (FS) signal to the first state in response to the logic gate setting the logic gate output signal to the first state and in response to the first logic gate setting the first logic gate output signal to the first state;
wherein the failsafe circuit is configured to receive the second logic gate output signal; and
wherein the failsafe circuit is configured to set the another failsafe state (FS) signal to the second state in response to the logic gate setting the logic gate output signal to the first state and in response to the second logic gate setting the first logic gate output signal to the first state.

2. The apparatus of claim 1:
wherein the set of high-side transistors and a set of low-side transistors are configured to ignore signals from the microcontroller if the failsafe enable (FE) signal is output by the failsafe circuit.

3. The apparatus of claim 1:
wherein a microcontroller is coupled to and configured to control the high-side and low-side gate driver circuits;
wherein the failsafe circuit is coupled to the microcontroller and the high-side and low-side gate driver circuits,
wherein the failsafe circuit controls the high-side and low-side gate driver circuits in response to detecting a malfunction in the microcontroller.

4. The apparatus of claim 3:
wherein the failsafe circuit is configured to assert the failsafe enable (FE) signal in response to the failsafe circuit asserting the signal or in response to any of the high-side gate driver circuits asserting its generic error signal;
wherein the failsafe circuit is configured to generate the failsafe state (FS) signal, which is set to a first voltage or to a second voltage;
wherein the failsafe state (FS) signal is set to the first voltage in response to the failsafe circuit setting the other signal to the first state or in response to any of the high-side gate driver circuits setting its specific error signal to the first state;

wherein the failsafe state (FS) signal is set to the second voltage in response to the failsafe circuit setting the other signal to the second state or in response to any of the high-side gate driver circuits setting its specific error signal to the second state;

wherein the failsafe circuit activates both the high-side transistors and the low-side transistors in response to the failsafe circuit asserting the failsafe enable (FE) signal and in response to the failsafe circuit setting the specific error signal to the first voltage;

wherein each of the high-side gate driver circuits activates its respective high-side transistor in response to the failsafe circuit asserting the failsafe enable (FE) signal and in response to the failsafe circuit setting the specific error signal to the first voltage;

wherein the failsafe circuit deactivates both the high-side transistors and the low-side transistors in response to the failsafe circuit asserting the failsafe enable (FE) signal and in response to the failsafe circuit setting the specific error signal to the second voltage;

wherein each of the high-side gate driver circuits deactivates its respective high-side transistor in response to the failsafe circuit asserting the failsafe enable (FE) signal and in response to the failsafe circuit setting the specific error signal to the second voltage.

5. The apparatus of claim 4:

wherein the failsafe circuit is configured to generate another failsafe state (FS) signal;

wherein the another failsafe state (FS) signal is set to the first voltage in response to the failsafe circuit setting the other signal to the second state or in response to any of the high-side gate driver circuits setting its specific error signal to the second state;

wherein the another failsafe state (FS) signal is set to the second voltage in response to the failsafe circuit setting the other signal to the first state or in response to any of the high-side gate driver circuits setting its specific error signal to the first state;

wherein each of the low-side gate driver circuits deactivates its respective low-side transistor in response to the failsafe circuit asserting the failsafe enable (FE) signal and in response to the failsafe circuit setting the third signal set to the second voltage;

wherein each of the low-side gate driver circuits activates its respective low-side transistor in response to the failsafe circuit asserting the failsafe enable (FE) signal and in response to the failsafe circuit setting the third signal to the first voltage.

6. An apparatus comprising:

a set of high-side gate driver circuits configured to selectively activate a set of high-side transistors, respectively;

wherein each of the high-side gate driver circuits is configured to assert a generic error signal when it detects an electrical short between terminals of its respective high-side transistor or when it detects its respective high-side transistor does not conduct current while activated;

wherein each of the high-side gate driver circuits is further configured to output a specific error signal, which is set to the first state or the second state;

wherein each of the high-side gate driver circuits sets its specific error signal to the first state when it detects the electrical short between the terminals of its respective high-side transistor;

wherein each of the high-side gate driver circuits sets its specific error signal to the second state when it detects its respective high-side transistor does not conduct current while activated;

a failsafe circuit configured to generate a failsafe enable (FE) signal in response to any of the high-side gate driver circuits asserting its generic error signal;

wherein the failsafe circuit is configured to generate a failsafe state (FS) signal, which is set to a first voltage or a second voltage;

wherein the failsafe state (FS) signal is set to the first voltage in response to any of the high-side gate driver circuits setting its specific error signal to the first state;

wherein the failsafe state (FS) signal is set to the second voltage in response to any of the high-side gate driver circuits setting its specific error signal to the second state;

wherein each of the high-side gate driver circuits activates its respective high-side transistor in response to the failsafe circuit asserting the failsafe enable (FE) signal and in response to the failsafe circuit setting the specific error signal to the first voltage;

wherein each of the high-side gate driver circuits deactivates its respective high-side transistor in response to the failsafe circuit asserting the failsafe enable (FE) signal and in response to the failsafe circuit setting the specific error signal to the second voltage;

a plurality of low-side gate driver circuits configured to selectively activate a set of low-side transistors, respectively;

wherein each of the low-side gate driver circuits is configured to assert the generic error signal when it detects an electrical short between terminals of its respective low-side transistor or when it detects its respective low-side transistor does not conduct current while activated;

wherein each of the low-side gate driver circuits is further configured output the specific error signal, which is set to the first state or the second state;

wherein each of the low-side gate driver circuits sets its specific error signal to the first state when it detects the electrical short between the terminals of its respective low-side transistor;

wherein each of the low-side gate driver circuits sets its specific error signal to the second state when it detects its respective low-side transistor does not conduct current while activated;

a logic gate coupled between the failsafe circuit and the low-side gate driver circuits, wherein the logic gate is configured to receive the generic error signals from the high-side and low-side gate driver circuits;

wherein the logic gate is configured to generate a logic gate output signal set to the first state or the second state;

wherein the logic gate output signal is set to the first state only when one or more of the generic error signals from the high-side or low-side gate driver circuits is set to the first state;

a first logic gate coupled between the failsafe circuit and the high-side gate driver circuits, wherein the first logic gate is configured to receive the specific error signals from the high-side gate driver circuits;

wherein the first logic gate is configured to generate a first logic gate output signal set to the first state or the second state;
wherein the first logic gate output signal is set to the first state only when one or more of the specific error signals from the high-side gate driver circuits is set to the first state;
a second logic gate coupled between the failsafe circuit and the low-side gate driver circuits;
wherein the second logic gate is configured to receive the specific error signals from the low-side gate driver circuits;
wherein the second logic gate is configured to generate a second logic gate output signal set to the first state or the second state;
wherein the second logic gate output signal is set to the first state only when one or more of the specific error signals from the low-side gate driver circuits is set to the first state;
wherein the failsafe circuit is configured to receive the logic gate output signal;
wherein the failsafe circuit is configured to assert the failsafe enable (FE) signal in response to the logic gate switching the logic gate output signal to the first state;
wherein the failsafe circuit is configured to receive the first logic gate output signal;
wherein the failsafe circuit is configured to set the failsafe state (FS) signal to the first state in response to the logic gate setting the logic gate output signal to the first state and in response to the first logic gate setting the first logic gate output signal to the first state;
wherein the failsafe circuit is configured to receive the second logic gate output signal; and
wherein the failsafe circuit is configured to set the another failsafe state (FS) signal to the second state in response to the logic gate setting the logic gate output signal to the first state and in response to the second logic gate setting the first logic gate output signal to the first state.

7. The apparatus of claim 6 further comprising:
the high-side transistors;
the low-side transistors;
wherein the high-side transistors are coupled in series with the low-side transistors, respectively.

8. The apparatus of claim 7:
wherein the failsafe circuit is configured to generate another failsafe state (FS) signal, which is set to the first voltage or the second voltage;
wherein the another failsafe state (FS) signal is set to the first voltage in response to any of the high-side gate driver circuits setting its specific error signal to the second state;
wherein the another failsafe state (FS) signal is set to the second voltage in response to any of the high-side gate driver circuits setting its specific error signal to the first state;
wherein each of the low-side gate driver circuits deactivates its respective low-side transistor in response to the failsafe circuit asserting the failsafe enable (FE) signal and in response to the failsafe circuit setting the third signal set to the second voltage;
wherein each of the low-side gate driver circuits activates its respective low-side transistor in response to the failsafe circuit asserting the failsafe enable (FE) signal and in response to the failsafe setting the third signal to the first voltage.

9. An apparatus comprising:
a microcontroller configured to control an inverter system;
a failsafe circuit configured to activate any one of a plurality of safe states in the inverter system in response to a detection of an electrical fault in the inverter system and in response to a malfunction in the microcontroller;
a set of high-side gate driver circuits configured to selectively activate a set of high-side transistors, respectively;
wherein each of the high-side gate driver circuits is configured to assert a generic error signal when it detects an electrical short between terminals of its respective high-side transistor or when it detects its respective high-side transistor does not conduct current while activated;
wherein each of the high-side gate driver circuits is further configured to output the specific error signal, which is set to the first state or the second state;
wherein each of the high-side gate driver circuits sets its specific error signal to the first state when it detects the electrical short between the terminals of its respective high-side transistor;
wherein each of the high-side gate driver circuits sets its specific error signal to the second state when it detects its respective high-side transistor does not conduct current while activated;
wherein the failsafe circuit is configured to assert a failsafe enable (FE) signal in response to any of the high-side gate driver circuits asserting its generic error signal and in response to the malfunction of the microcontroller;
wherein the failsafe circuit is configured to generate a failsafe state (FS) signal, which is set to a first voltage or a second voltage;
wherein the failsafe state (FS) signal is set to the first voltage in response to any of the high-side gate driver circuits setting its specific error signal to the first state;
wherein the failsafe state (FS) signal is set to the second voltage in response to any of the high-side gate driver circuits setting its specific error signal to the second state;
wherein each of the high-side gate driver circuits activates its respective high-side transistor in response to the failsafe circuit asserting the failsafe enable (FE) signal and in response to the failsafe circuit setting the specific error signal to the first voltage;
wherein each of the high-side gate driver circuits deactivates its respective high-side transistor in response to the failsafe circuit asserting the failsafe enable (FE) signal and in response to the failsafe circuit setting the specific error signal to the second voltage
a set of low-side gate driver circuits configured to selectively activate a plurality of low-side transistors, respectively;
wherein each of the low-side gate driver circuits is configured to assert the generic error signal when it detects an electrical short between terminals of its respective low-side transistor or when it detects its respective low-side transistor does not conduct current while activated;
wherein each of the low-side gate driver circuits is further configured output the specific error signal, which is set to the first state or the second state;

wherein each of the low-side gate driver circuits sets its specific error signal to the first state when it detects the electrical short between the terminals of its respective low-side transistor;

wherein each of the low-side gate driver circuits sets its specific error signal to the second state when it detects its respective low-side transistor does not conduct current while activated;

a logic gate coupled between the failsafe circuit and the first and low-side gate driver circuits, wherein the logic gate is configured to receive the generic error signals from the high-side and low-side gate driver circuits, and wherein the logic gate is configured to generate a logic gate output signal set to the first state or the second state, wherein the logic gate output signal is set to the first state only when one or more of the generic error signals from the high-side or low-side gate driver circuits is set to the first state;

a first logic gate coupled between the failsafe circuit and the high-side gate driver circuits, wherein the first logic gate is configured to receive the specific error signals from the high-side gate driver circuits, and wherein the first logic gate is configured to generate a first logic gate output signal set to the first state or the second state, wherein the first logic gate output signal is set to the first state only when one or more of the specific error signals from the high-side gate driver circuits is set to the first state;

a second logic gate coupled between the failsafe circuit and the low-side gate driver circuits, wherein the second logic gate is configured to receive the specific error signals from the low-side gate driver circuits, and wherein the second logic gate is configured to generate a second logic gate output signal set to the first state or the second state, wherein the second logic gate output signal is set to the first state only when one or more of the specific error signals from the low-side gate driver circuits is set to the first state;

wherein the failsafe circuit is configured to receive the logic gate output signal;

wherein the failsafe circuit is configured to assert the failsafe enable (FE) signal in response to the logic gate switching the logic gate output signal to the first state;

wherein the failsafe circuit is configured to set the failsafe state (FS) signal to the first state in response to the logic gate setting the logic gate output signal to the first state and in response to the first logic gate setting the first logic gate output signal to the first state;

wherein the failsafe circuit is configured to receive the second logic gate output signal; and wherein the failsafe circuit is configured to set the another failsafe state (FS) signal to the second state in response to the logic gate setting the logic gate output signal to the first state and in response to the second logic gate setting the first logic gate output signal to the first state.

10. The apparatus of claim 9 further comprising the inverter system, wherein the inverter system comprises:
the set of high-side transistors;
the set of low-side transistors coupled to the high-side transistors, respectively;
wherein the plurality of safe states includes a first state and a second state;
wherein the high-side transistors are activated in the first state;
wherein the low-side transistors are deactivated in the first state;
wherein the high-side transistors are deactivated in the second state;
wherein the low-side transistors are activated in the second state.

11. The apparatus of claim 9:
wherein the failsafe circuit is configured to generate another failsafe state (FS) signal, which is set to the first voltage or the second voltage;
wherein the another failsafe state (FS) signal is set to the first voltage in response to any of the high-side gate driver circuits setting its specific error signal to the second state;
wherein the another failsafe state (FS) signal is set to the second voltage in response to any of the high-side gate driver circuits setting its specific error signal to the first state;
wherein each of the low-side gate driver circuits deactivates its respective low-side transistor in response to the failsafe circuit asserting the failsafe enable (FE) signal and in response to the failsafe circuit setting the third signal set to the second voltage;
wherein each of the low-side gate driver circuits activates its respective low-side transistor in response to the failsafe circuit asserting the failsafe enable (FE) signal and in response to the failsafe circuit setting the third signal to the first voltage.

* * * * *